United States Patent [19]

Reuter

[11] Patent Number: 5,322,484

[45] Date of Patent: Jun. 21, 1994

[54] LOCKING DIFFERENTIAL WITH CLUTCH ACTIVATED BY ELECTRORHEOLOGICAL FLUID COUPLING

[75] Inventor: David C. Reuter, Fort Wayne, Ind.

[73] Assignee: Dana Corporation, Toledo, Ohio

[21] Appl. No.: 995,469

[22] Filed: Dec. 22, 1992

[51] Int. Cl.$^5$ ............................................. F16D 27/00
[52] U.S. Cl. .................................... 475/150; 475/249; 192/215
[58] Field of Search .................... 192/21.5, 35, 48.2, 192/57, 586, 70.23, 84 R, 93 A; 475/87, 89, 116, 118, 150, 154, 249, 84, 85, 86

[56] References Cited

U.S. PATENT DOCUMENTS

| | | | |
|---|---|---|---|
| 2,709,507 | 5/1955 | Trickey | 192/21.5 |
| 2,718,292 | 9/1955 | Meilander et al. | 192/84 R X |
| 2,887,200 | 5/1959 | Mergen et al. | 192/35 |
| 3,055,234 | 9/1962 | O'Brien | 475/234 |
| 3,404,580 | 10/1968 | Valenti | 74/424.8 R |
| 3,605,523 | 9/1971 | O'Brien | 475/234 |
| 3,791,501 | 2/1974 | Culbertson | 192/93 A |
| 4,031,780 | 6/1977 | Dolan et al. | 475/87 X |
| 4,048,872 | 9/1977 | Webb | 192/35 |
| 4,058,027 | 11/1977 | Webb | 475/87 X |
| 4,662,499 | 5/1987 | Jordan | 475/150 X |
| 4,683,998 | 8/1987 | Cigdem et al. | 192/35 X |
| 4,757,727 | 7/1988 | Teraoka et al. | 475/85 |
| 4,781,078 | 11/1988 | Blessing et al. | 475/150 |
| 4,838,119 | 6/1989 | Teraoka et al. | 415/85 |
| 4,896,754 | 1/1990 | Carlson et al. | 192/21.5 |
| 4,899,859 | 2/1990 | Teraoka | 192/57 X |
| 4,914,980 | 4/1990 | Taureg et al. | 475/89 |
| 4,976,347 | 11/1990 | Sakakibara et al. | 192/93 A X |
| 5,036,963 | 8/1991 | Murata | 192/35 |
| 5,041,065 | 8/1991 | Kwoka | 192/586 X |
| 5,070,975 | 12/1991 | Tanaka et al. | 192/93 A X |
| 5,083,986 | 1/1992 | Teraoka et al. | 192/58 C X |
| 5,090,531 | 2/1992 | Carlson | 192/21.5 |
| 5,156,578 | 10/1992 | Hirota | 475/150 |

FOREIGN PATENT DOCUMENTS

| | | | |
|---|---|---|---|
| 3426460 | 12/1985 | Fed. Rep. of Germany | 192/57 |
| 2-26328 | 1/1990 | Japan | 192/57 |
| 2-38722 | 2/1990 | Japan | 192/57 |
| 3-265745 | 11/1991 | Japan | 475/89 |
| 4-83945 | 3/1992 | Japan | 475/150 |
| 2219364 | 12/1989 | United Kingdom | 475/87 |

Primary Examiner—Leslie A. Braun
Assistant Examiner—Khoi Ta
Attorney, Agent, or Firm—Dykema Gossett

[57] ABSTRACT

A limited slip differential includes a friction clutch mechanism, a viscous coupling, and a camming mechanism disposed between the friction clutch mechanism and the viscous coupling. The camming mechanism converts shearing forces within the viscous coupling to an axial force applied to engage the clutch mechanism. The camming mechanism includes annular discs having axially inclined ramps, and a roller bearing for movement along the ramps to provide for variable spacing between the annular discs, wherein increased spacing is used to apply the axial force.

11 Claims, 2 Drawing Sheets

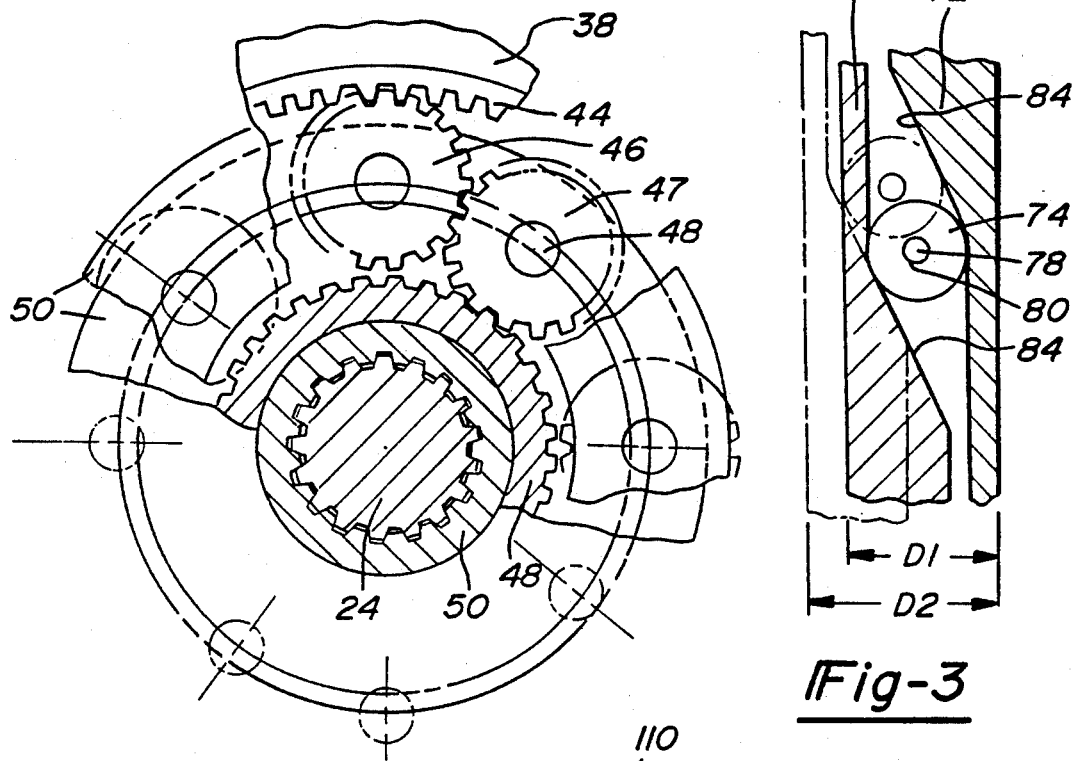
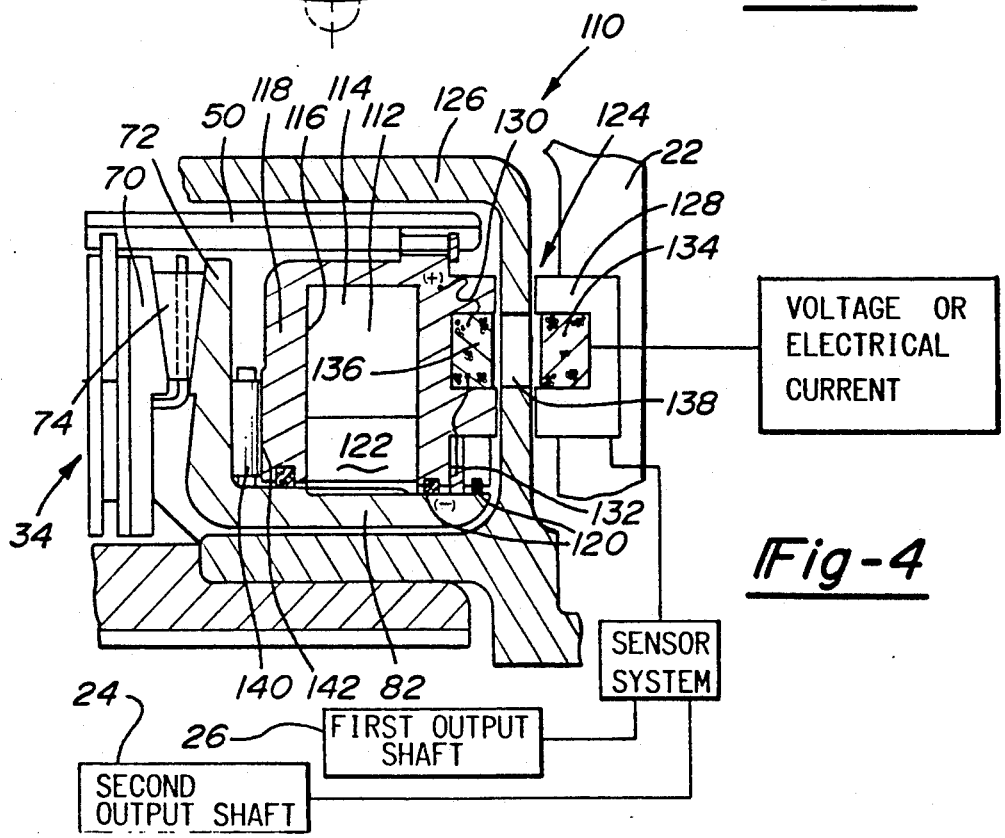

LOCKING DIFFERENTIAL WITH CLUTCH ACTIVATED BY ELECTRORHEOLOGICAL FLUID COUPLING

BACKGROUND OF THE INVENTION

This invention relates to a limited slip differential which is actuated to limit the relative rotational speed between two driven shafts above a predetermined amount.

Limited slip differentials are known for providing rotational drive to two output shafts. In particular, such differentials are often used to drive the axles of motor vehicles. A limited slip differential allows relative rotation between two output shafts under certain circumstances. For example, when a vehicle turns, the output shaft of the outer wheel typically turns at a higher rotational speed than the output shaft of the inner wheel. A limited slip differential allows this relative rotation. If one of the wheels begins to slip, however, the relative rotational speed between the output shafts of the two wheels exceeds a predetermined limit. A limited slip differential resists such relative rotational speed.

One known limited slip differential employs a viscous coupling which "monitors" any relative rotation between the two output shafts. Should the relative rotational speed exceed a certain limit, viscous fluid in the viscous coupling expands to create an axial force against an actuation member. In turn, the actuation member is forced against, and engages a friction clutch, directly connecting the first and second output shafts.

There are drawbacks to such prior art differentials. Relying on fluid expansion does not provide fine control over the amount of relative rotation required before clutch actuation. Further, the reliance on the expanding fluid also may not be easily controlled to allow variation of the desired limit on relative rotational speed.

SUMMARY OF THE INVENTION

In a disclosed embodiment of the present invention, a limited slip differential incorporates a friction clutch which is selectively actuated to directly contact two driven shafts. A viscous coupling is connected to the friction coupling by a pair of rotatable discs with inclined cam surfaces formed between the discs. Should there be an undesirable amount of relative rotational speed, the viscous coupling creates a rotational shear force causing a first disc to rotate relative to the second disc. The relative rotation of the discs causes the inclined cam surfaces to move relative to each other, in turn resulting in axial movement of the second disc to engage the friction clutch.

With the inventive differential, fluid expansion is replaced by the more predictable shear viscous coupling as an indication of an undesirably high relative rotational speed. Moreover, the parameters of the viscous coupling and discs may be easily varied to control the amount of relative rotational speed which is allowed prior to actuation of the friction clutch. As an example, the cam surfaces can be varied to control the desired amount of relative rotational speed.

These and other features of the present invention can be best understood from the following specification and drawings, of which the following is a brief description.

BRIEF DESCRIPTION OF THE DRAWINGS

FIG. 2 is a cross-sectional view taken substantially along line 2—2 as shown in FIG. 1.

FIG. 3 is a fragmented cross-sectional view taken substantially along line 3—3 as shown in FIG. 1.

FIG. 4 is a cross-section view of an alternate embodiment of the present invention.

DETAILED DESCRIPTION OF THE PREFERRED

Figure 1:
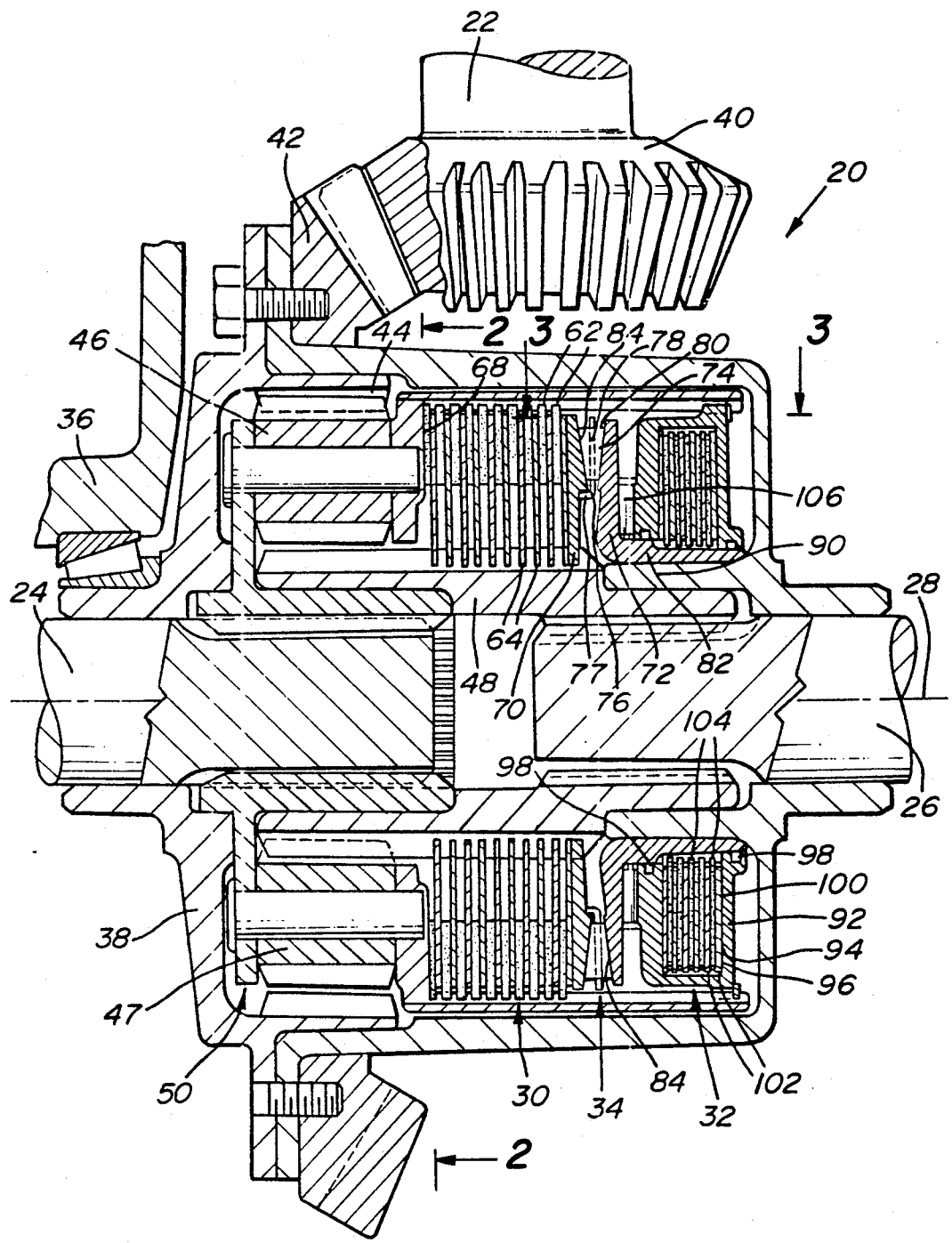
FIG. 1 is cross-sectional view of a limited slip differential according to the present invention.

Referring now to the drawings, FIG. 1 illustrates a differential gear assembly 20 including an input drive shaft 22, a left output shaft 24 and a right output shaft 26. Left output shaft 24 and right output shaft 26 extend along a common output drive axis 28. The left and right directions are defined as shown in FIG. 1.

To limit the relative rotational speed between output shafts 24 and 26, differential gear assembly 20 includes a clutch mechanism 30, a viscous coupling 32 and a camming mechanism 34. As will be explained, viscous coupling 32 reacts to an undesirably large relative rotational speed between output shafts 24 and 26. Camming mechanism 34 is responsive to a "signal" from viscous coupling 32 to provide a force to selectively engage clutch mechanism 30 and directly connect output shafts 24 and 26.

Differential gear assembly 20 is shown as a planetary differential including an outer housing 36 enclosing a rotatable differential gear case 38. Input drive shaft 22 has a drive pinion gear 40 that engages an annular gear 42 mounted on an outer surface of gear case 38. A ring gear 44 is driven with gear case 38 and meshes with outer planet gears 46 that in turn mesh with inner planet gears 47.

Outer planet gears 46 mesh with ring gear 44 while inner planet gears 47 mesh with a sun gear 48. Sun gear 48 is coupled to right output shaft 26 by cooperating sets of splines. A planet carrier assembly 50 is concentric with sun gear 48, and is coupled to left output shaft 24 by cooperating sets of splines. The structure of the planetary system is shown in detail in FIG. 2.

Clutch mechanism 30 is positioned inside gear case 38 to provide selective resistance to relative rotation between left output shaft 24 and right output shaft 26. Clutch mechanism 30 includes a plurality of clutch plates 62 slidably coupled to carrier assembly 50 and thereby rotationally linked to left output shaft 24. Clutch plates 62 alternate with a plurality of intermediate clutch plates 64 which are slidably coupled to sun gear 48, rotationally linking intermediate clutch plates 64 to right output shaft 26. A left end of clutch mechanism 30 abuts an annular pressure plate 68 which prevents undue axial movement of clutch mechanism 30 to the left.

A right end of clutch mechanism 30 abuts a reaction annular disc 70 of camming mechanism 34. Camming mechanism 34 also includes a signal annular disc 72 and intermediate tapered roller bearings 74. A bearing support ring 76 has an annular portion 77 disposed radially inwardly of tapered roller bearings 74, and includes a plurality of radially outwardly extending shafts 78 which extend through bores 80 formed in tapered roller bearings 74. Alternatively, a cage having slots may be used to position bearings 74, depending on the amount of axial movement. Reaction annular disc 70 rotates with sun gear 48, but is free to move axially. Signal annular disc 72 is generally axially fixed along output drive axis 28 and includes an axially extending hub 82, which forms a component of viscous coupling 32.

As shown in FIG. 3, annular discs 70 and 72 both include a plurality of circumferentially spaced ramps 84. In a preferred embodiment, four ramps 84 are formed on each annular disc 70 and 72. Opposing ramps 84 of each annular disc 70 and 72 have complimentary surfaces which are axially inclined along a circumferential direction.

If signal annular disc 72 rotates relative to reaction annular disc 70, tapered roller bearings 74 will move along ramps 84, moving reaction annular disc 70 to the left from position D1 to position D2. The movement of reaction annular disc 70 applies an axial force to actuate clutch mechanism 30.

As shown in FIG. 1, ramps 84 are also axially inclined in a radial plane to accommodate the shape of tapered roller bearings 74 to maintain line contact between the two. Ramps 84 are thus axially inclined along both a circumferential and a radial direction. The tapered roller bearings 74 are preferred since they provide line contact between the discs and roller bearings 74. Even so, movement of reaction annular disc 70 may also be accomplished without a tapered roller bearing 74 by only using ramps 84 or by using a spherical ball on a cylindrical roller.

As shown in FIG. 1, a viscous coupling 32 is positioned concentric with sun gear 48 and supported on a radial shelf 90 of gear case 38 that extends axially inwardly. Alternatively, a clearance may exist between shelf 90 and hub 82. Viscous coupling 32 includes a casing 92 coupled to carrier assembly 50. A chamber 96 is defined by casing 92 and hub 82 of signal annular disc 72. Seals 98 are positioned at a relatively rotating contacting area between casing 92 and hub 82 to prevent leakage of fluid 100 from chamber 96.

As will be described, viscous coupling 32 provides a force in response to relative rotational speeds between output shafts 24 and 26. As such, it could be said to provide a "signal" of undesirably high relative rotation. Viscous coupling 32 includes a first set of viscous plates 102 coupled to casing 92 and a second set of viscous plates 104 coupled to hub 82.

During vehicle operation, viscous plates 102 rotate directly with carrier assembly 50 which in turn rotates left output shaft 24. Viscous plates 104 are indirectly rotated through camming mechanism 34 by the following arrangement. Reaction annular disc 70 rotates directly with sun gear 48, which rotates right output shaft 26. Rotation is transferred from reaction annular disc 70 to tapered roller bearings 74, which rotate signal annular disc 96, which in turn rotates viscous plates 104. A bearing 106 is disposed between casing 92 and signal annular disc 72.

When a small difference in rotational speed exists, such as that occurring when a vehicle turns, viscous coupling 32 does not actuate clutch mechanism 30. If the speed difference between plates 102 and 104 becomes too great, however, a shear force is created which resists the relative rotation of plates 102 and 104. Resistance to rotation of viscous plates 104 resists rotation of signal annular disc 72, which then rotates relative to tapered roller bearing 74, and reaction annular disc 70. Tapered roller bearing 74 then rolls along ramps 84 causing reaction annular disc 70 to be forced to the left, engaging clutch mechanism 30.

FIG. 4 illustrates an alternative embodiment incorporating an electro-resistive coupling 110 to provide a force causing movement of reaction annular disc 70. Operation of the differential assembly with electro-resistive coupling 110 is nearly identical to operation with viscous coupling 32, except that an electrorheological fluid 112, which thickens in the presence of electricity, is used to provide the shearing force. As the charge becomes stronger, the density of fluid 112 increases.

Coupling 110 includes a chamber 114 defined by a conductive casing 118 and hub 82 of signal annular disc 72. Seals 120 allow relative rotation of conductive casing 118 and hub 82 while sealing chamber 114. An annular rotor 122 is splined to hub 82 in chamber 114 to resist relative rotation. This resistance increases as fluid 112 is charged.

To charge fluid 112, a transformer 124 provides a current to conductive casing 118. A direct connection is not used because conductive casing 118 rotates within a gear case 126. Therefore, transformer 124 includes a first transformer unit 128 positioned outside gear case 126 and embedded in outer housing 22, and a second transformer unit 130 grounded at 132 and embedded in conductive casing 118. Transformer units 128 and 130 are generally annular. First transformer unit 128 produces a magnetic field which induces a magnetic field in second transformer unit 130 through a plurality of slots 138 formed in gear case 126. The magnetic field in second transformer 130 induces a current in fluid 112 through conductive casing 118 (thickening) fluid 112 and creating increased shear resistance between conductive casing 118 and rotor 122. Other types of current generators may be used.

In this second embodiment, a sensor system (not shown) is used to externally monitor the relative rotation between left output shaft 24 and right output shaft 26. When an extreme difference is sensed, a charge is induced in fluid 112.

To avoid loss of current from conductive case 118, a non-conductive bearing 140 may be used. Alternatively, a non-conductive spacer 142 may be disposed between a standard bearing and conductive casing 118. A non-conductive spacer 144 is also provided at a radially outer portion of conductive casing 118 in contact with carrier assembly 50.

Preferred embodiments of the present invention have been disclosed. A worker of ordinary skill in the art will recognize, however, that modification of the disclosed embodiments would come within the scope of this invention. For that reason, the following claims should be studied to determine the true scope and content of this invention.

What is claimed is:

1. A limited slip differential assembly comprising:
an input member;
a first output shaft;
a second output shaft coaxial with said first output shaft, said first and second output shafts rotating about an output drive axis;
a gear means interposed between said input member and said first and second output shafts, said gear means transmitting rotation from said input member to said first and second output shafts, said gear means providing rotation of said first output shaft relative to said second output shaft;
a clutch mechanism, said clutch mechanism providing resistance to relative rotation between said first output shaft and said second output shaft;

a coupling having a first and second coupling members, said first and second coupling members defining a chamber having an electrorheological fluid, said electrorheological fluid increasing in density when charged by an electrical current, said electrorheological fluid providing resistance to rotation of said first coupling member relative to said second coupling member;

means for inducing said electrical current in said electrorheological fluid; and a camming mechanism for engaging said clutch mechanism, said camming mechanism including a first disc associated with said coupling, and a second disc associated with said clutch mechanism, each of said first and said second discs having an inclined surface formed between said first and second discs, said inclined surfaces being axially inclined along a circumferential direction relative to said output drive axis, said means for inducing said electrical current being actuated in response to a predetermined amount of relative rotation between said first output shaft and said second output shaft, said coupling thereby creating a resistance to rotation of said first disc relative to said second disc, the resistance to rotation causing said first disc to rotate relative to said second disc, said inclined surfaces camming to result in an axial force actuating said clutch mechanism.

2. The differential assembly as recited in claim 1, wherein a rotating member is received between said inclined surfaces of said first and second discs of said camming mechanism.

3. The differential assembly as recited in claim 2, wherein said rotating member is a tapered roller bearing, said roller bearing having a varying cross-section along a radial direction with respect to said roller bearing, said inclined surfaces of said first and second discs being dimensioned to conform to the shape of said roller bearing.

4. The differential assembly as recited in claim 1, wherein said differential assembly further includes:

a sensor system monitoring the relative rotation of said first output shaft and said second output shaft, said sensor system actuating said means for inducing said electrical current upon sensing relative rotation of said first output shaft and said second output shaft above said predetermined amount.

5. A limited slip differential comprising:

an input member;

a first output shaft;

a second output shaft;

a gear means interposed between said input member and said first and second output shafts, said gear means transmitting rotation from said input member to said first and second output shafts, said gear means providing rotation of said first output shaft relative to said second output shaft;

a clutch mechanism for directly connecting said first output shaft and said second output shaft to provide resistance to relative rotation between said first output shaft and said second output shaft;

a coupling having a first and second coupling members, said first and second coupling members defining a chamber having an electrorheological fluid, said electrorheological fluid increasing in density when charged by an electrical current, said electrorheological fluid providing resistance to rotation of said first coupling member and said second coupling member;

means for inducing said electrical current in said electrorheological fluid, said means including a transformer adjacent one of said first and second coupling members, said transformer inducing said electrical current to charge said electrorheological fluid; and a camming mechanism for engaging said clutch mechanism, said camming mechanism providing a force to engage said clutch mechanism, said camming mechanism being responsive to a resistance to rotation of said first coupling member relative to said second coupling member of said coupling;

a sensor system monitor the relative rotation of said first output shaft and said second output shaft, said sensor system actuating said means for inducing said electrical current upon sensing relative rotation of said first output shaft and said second output shaft above a predetermined amount, said electrorheological fluid thereby being charged to create the resistance to rotation of said first and second coupling members of said coupling.

6. A limited slip differential having clutch activated by a coupling, said assembly comprising:

a housing;

an input member adapted to rotate said housing;

a first output shaft extending into said housing, said first output shaft rotating about an output drive axis;

a second output shaft extending into said housing, said output shaft being coaxial with said first output shaft, said second output shaft rotating about said output drive axis;

a gear means interposed between said housing and at least one of said first and second output shafts for transmitting rotation to said first and second output shafts, said gear means providing rotation of said first output shaft relative to said second output shaft;

a friction clutch mechanism, said clutch mechanism being engagable and providing resistance to relative rotation between said first output shaft and said second output shaft;

a coupling having a first and second coupling members, said first and second coupling members defining a chamber having an electrorheological fluid, said electrorheological fluid increasing in density when charged by an electrical current, said electrorheological fluid providing resistance to rotation of said first coupling member and said second coupling member;

means for inducing said electrical current in said electrorheological fluid, said means including a first transformer unit and a second transformer unit, said first transformer unit being outside said housing, said second transformer unit being within said housing, said second transformer unit being adjacent one of said first and second coupling members, said second transformer unit being responsive to a magnetic field generated by said first transformer unit to induce said electrical current to charge said electrorheological fluid; and a camming mechanism for selectively engaging said clutch mechanism, said camming mechanism providing a force to engage said clutch mechanism, said camming mechanism being responsive to a resistance to rotation of said first coupling member relative to said second coupling member of said coupling, said means for inducing said electrical current being actuated in response to a predetermined amount of relative rotation between said first output shaft and said second output shaft, said electrical current thereby charging said electrorheological fluid.

7. The differential as recited in claim 6, wherein said differential assembly further includes:

a sensor system monitoring the relative rotation of said first output shaft and said second output shaft, said sensor system actuating said means for inducing said electrical current upon sensing relative rotation of said first output shaft and said second output shaft above said predetermined amount.

8. The limited slip differential of claim 6, wherein said housing includes a plurality of apertures between said first transformer unit and said second transformer unit.

9. The limited slip differential of claim 6, wherein said second transformer unit is embedded in one of said first and second coupling members, said coupling member being formed of electrically conductive material.

10. The limited slip differential of claim 6, wherein said first and second transformer units are annular and extend about said output drive axis.

11. The limited slip differential of claim 9, wherein non-conductive bearings are positioned between said coupling member and adjacent differential members.

* * * * *

UNITED STATES PATENT AND TRADEMARK OFFICE
CERTIFICATE OF CORRECTION

PATENT NO. : 5,322,484
DATED : June 21, 1994
INVENTOR(S) : David C. Reuter It is certified that error appears in the above-identified patent and that said Letters Patent is hereby corrected as shown below:

Column 6, line 15, delete "monitor" and insert --monitoring--

Signed and Sealed this

Sixth Day of September, 1994

*Attest:*

BRUCE LEHMAN

*Attesting Officer*     *Commissioner of Patents and Trademarks*